(12) United States Patent
Kitchen

(10) Patent No.: US 12,110,876 B1
(45) Date of Patent: Oct. 8, 2024

(54) GEOTHERMAL POWER SYSTEMS AND METHODS FOR SUBSEA SYSTEMS

(71) Applicant: OneSubsea IP UK Limited, London (GB)

(72) Inventor: David Kitchen, Stonehouse (GB)

(73) Assignee: OneSubsea IP UK Limited, London (GB)

( * ) Notice: Subject to any disclaimer, the term of this patent is extended or adjusted under 35 U.S.C. 154(b) by 0 days.

(21) Appl. No.: 18/519,915

(22) Filed: Nov. 27, 2023

(51) Int. Cl.
  *F03G 4/00* (2006.01)
  *E21B 43/01* (2006.01)

(52) U.S. Cl.
  CPC .............. *F03G 4/023* (2021.08); *E21B 43/01* (2013.01); *F03G 4/033* (2021.08); *F03G 4/066* (2021.08); *Y02E 10/10* (2013.01)

(58) Field of Classification Search
  CPC ...................... F03G 7/04–047; F03G 4/00–074
  See application file for complete search history.

(56) References Cited

U.S. PATENT DOCUMENTS

| | | | | |
|---|---|---|---|---|
| 4,112,687 A | * | 9/1978 | Dixon | F03G 7/04 290/1 R |
| 11,187,212 B1 | * | 11/2021 | Bodishbaugh | F24T 50/00 |
| 11,421,663 B1 | * | 8/2022 | Bodishbaugh | F22B 35/18 |
| 2018/0355674 A1 | * | 12/2018 | Cooper | E21B 43/01 |

FOREIGN PATENT DOCUMENTS

DE  102016223611 A1 * 5/2018

* cited by examiner

*Primary Examiner* — Laert Dounis
(74) *Attorney, Agent, or Firm* — Jeffrey D. Frantz

(57) ABSTRACT

A system includes a subsea geothermal power system. The subsea geothermal power system includes a well connection configured to couple to a hydrocarbon well. The subsea geothermal power system also includes a geothermal power plant fluidly coupled to the well connection. The geothermal power plant is configured to receive thermal energy from a well fluid received from the hydrocarbon well and convert the thermal energy into at least one of electrical energy and mechanical energy. The system also includes a subsea equipment at least partially powered by at least one of the electrical energy and the mechanical energy produced by the subsea geothermal power system.

20 Claims, 10 Drawing Sheets

GEOTHERMAL POWER SYSTEMS AND METHODS FOR SUBSEA SYSTEMS

BACKGROUND

The subject matter disclosed herein relates to one or more geothermal power systems disposed in a subsea system.

A subsea system used for extracting hydrocarbons includes one or more electrically-powered subsystems, including a manifold, a tree, a pump station, and the like. These electrically-powered subsystems are conventionally electrically coupled to a power station, which is powered via one or more electrical cables (e.g., umbilical cables) that electrically couple the power station to a surface platform. Due to the amount of power that is transmitted through these electrical cables to the power station and the shielding used for protecting the electrical cables from the surrounding water, the manufacturing cost of these electrical cables is substantial. Additionally, due to the length of the cable and other factors, loss of power through the electrical cables is known to occur. Accordingly, a need exists for at least lowering the manufacturing cost of these electrical cables and mitigating the likelihood of loss of power transmission.

SUMMARY

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a system includes a subsea geothermal power system. The subsea geothermal power system includes a well connection configured to couple to a hydrocarbon well. The subsea geothermal power system also includes a geothermal power plant fluidly coupled to the well connection. The geothermal power plant is configured to receive thermal energy from a well fluid received from the hydrocarbon well and convert the thermal energy into at least one of electrical energy and mechanical energy. The system also includes a subsea equipment at least partially powered by at least one of electrical energy and mechanical energy produced by the subsea geothermal power system.

In another embodiment, a system includes a subsea retrieval module. The subsea retrievable module includes a fluid connection configured to receive a well fluid. The subsea retrievable module also includes a geothermal power plant fluidly coupled to the fluid connection. The geothermal power plant includes a fluid circuit having a first heat exchanger configured to transfer thermal energy from the well fluid to a thermal fluid circulating in the fluid circuit, and a turbine driven by the thermal fluid. The geothermal power plant is configured to power one or more subsea equipment with at least one of mechanical energy generated by the turbine and electrical energy generated by an electrical generator driven by the turbine.

In another embodiment, a method of controlling a subsea system includes receiving thermal energy from a well fluid received from a hydrocarbon well in a geothermal power plant fluidly coupled to a well connection. The method also includes converting the thermal energy into at least one of electrical energy and mechanical energy. The method also includes at least partially powering a subsea equipment with at least one of electrical energy and mechanical energy produced by the subsea geothermal power system.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
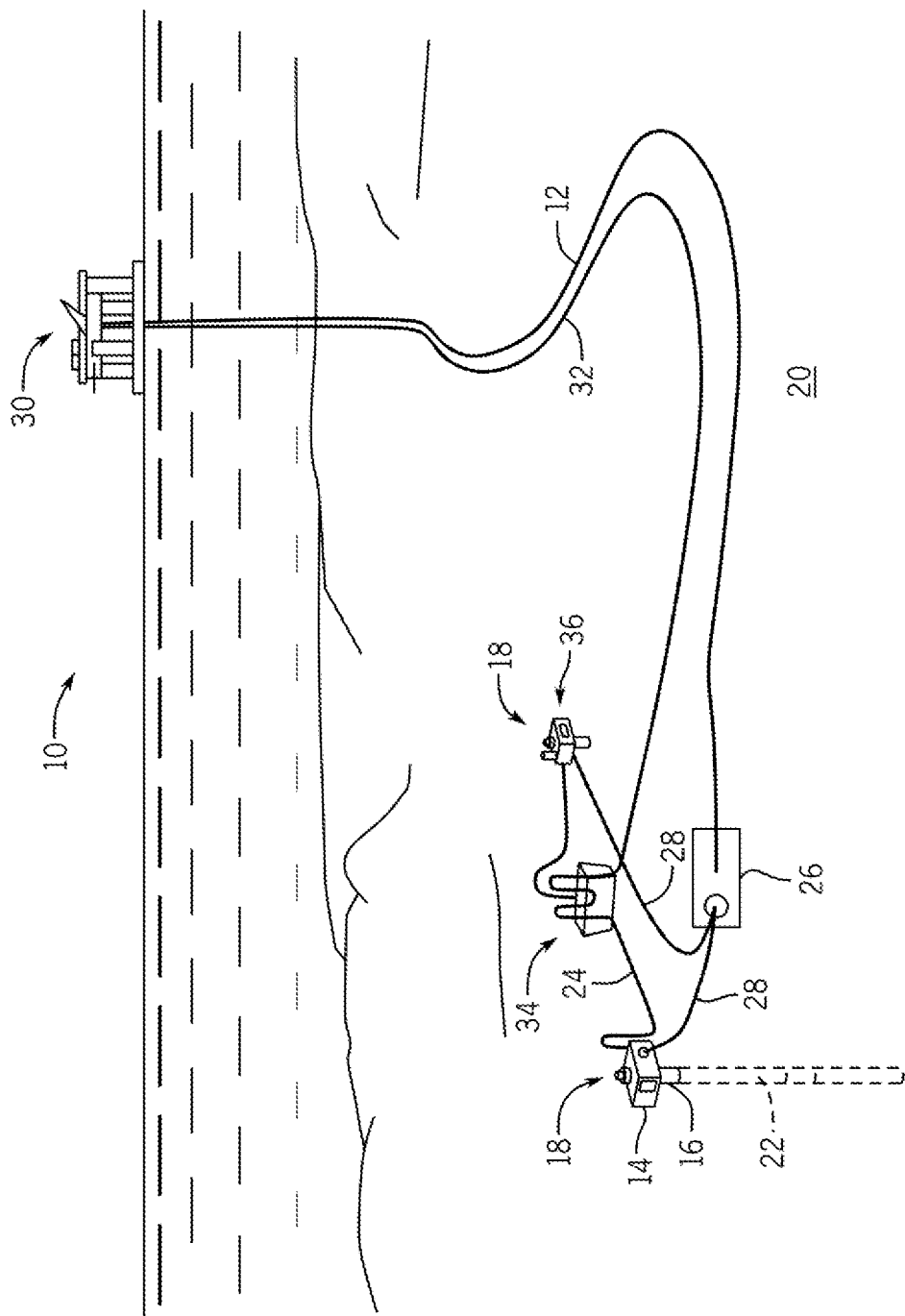
FIG. 1 is a schematic view of a subsea system, according to an embodiment of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection (e.g., where the connection may not include or include intermediate or intervening stations between those coupled), and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

The present disclosure is generally directed toward one or more one or more geothermal power systems that are distributed throughout a subsea system that may be used to produce power for use by the subsea system and/or a surface platform. In particular, the disclosed embodiments may be used for powering one or more trees (e.g., Christmas tree, frac tree, production tree, etc.) coupled to one or more wells throughout the field (e.g., a hydrocarbon field), one or more field extensions, the controller, the pump station, the manifold, subsea boosting, subsea compression, pipe heating, or a combination thereof. In certain embodiments, power produced by the one or more geothermal power systems may be sent to a surface platform via an electrical cable (e.g., umbilical cable). It may appreciated that a geothermal power system that includes a plurality of geothermal wells may produce sufficient power to eliminate the three phase power cable portion of the electrical cables connecting the surface platform, thereby reducing the manufacturing cost of the electrical cable. A geothermal power system having a plurality of geothermal wells may also eliminate the traditional fuel (e.g., diesel fuel) that may be used for powering pumps and/or separators. Additionally, the one or more geothermal power systems may be able to mitigate the chance of losing power due to a loss of power transmission through the electrical cable. The use of one or more geothermal power systems disposed throughout the subsea system also produces zero carbon emissions, thereby offsetting and potentially reducing the amount of carbon emissions produced for powering various stations of the subsea system.

With the foregoing in mind, FIG. 1 is a schematic view of a subsea system 10 with electrical cables 12 (e.g., umbilical cables) used for transmitting information and primary electrical power for various subsea stations (e.g., actuators, sensors, etc.). The subsea system 10 may include a subsea hydrocarbon production system configured to extract oil or gas from a subterranean reservoir, a subsea fluid injection system configured to inject fluid (e.g., liquid or gas) into a subterranean reservoir, or any other subsea system associated with subterranean reservoirs. For example, the subsea fluid injection system may include a subsea gas, water, and/or carbon dioxide ($CO_2$) injection system. In certain embodiments, the subsea system 10 may include a subsea tree 14 coupled to a wellhead 16 to form a subsea station 18 configured to extract and/or inject fluids relative to a subterranean reservoir. In certain embodiments, the subsea tree 14 includes a Christmas tree having a set of valves, spools, and fittings connected to the top of a well to direct and control the flow of formation fluids from the well. An example of the Christmas tree is a production tree, which may be installed after completion of hydraulic fracturing. The subsea tree 14 may include a frac tree having upper and lower master valves, a flow cross, wing valves, a goat head, and a swap valve, wherein the frac tree is configured to facilitate hydraulic fracturing. However, the subsea tree 14 may include any type and configuration and trees. The subsea station 18 may be configured to extract formation fluid, such as oil and/or natural gas, from the sea floor 20 through the well 22. By further example, the subsea station 18 may be configured to inject $CO_2$ into the subterranean reservoir. In some embodiments, the subsea system 10 may include multiple subsea stations 18 that extract and/or inject fluids relative to respective wells 22.

In embodiments of the subsea system 10 configured for production, after passing through the subsea tree 14, the formation fluid flows through fluid conduits or pipes 24 to a manifold 26 (e.g., pipeline manifold or flowline manifold). The manifold 26 may connect to one or more flowlines 28. In some embodiments, the surface platform 30 may include a floating production, storage, and offloading unit (FPSO) or a shore-based facility. In addition to flowlines 28 that carry the formation fluid away from the wells 22, the subsea system 10 may include a conduit 32 that carry production fluid (e.g., hydrocarbons, oil, natural gas, etc.) to the surface platform 30.

A conduit 32 is fluidly connected to the pump station 34, which is configured to pump the production fluid from the seabed 20 to the surface platform 30. In some scenarios, the platform 30 may be located a significant distance (e.g., greater than 100 m, greater than 1 km, greater than 10 km, or greater than 60 km) away from the wells 22. As discussed in further detail below, the subsea system 10 (e.g., the subsea tree 14, the subsea station 18, the manifold 26, and/or the pump station 34) may include one or more geothermal power systems 36 (e.g., subsea geothermal power systems) that provide primary and/or secondary power over one or more buses to various subsea stations (e.g., actuators, sensors, etc.). For example, the one or more geothermal power systems 36 may be configured to provide secondary power, such as during a power loss from the primary power from the electrical cables 12, to operate various valves, sensors, and other subsea stations. While the subsea system 10 described above is for extracting hydrocarbons, it should be understood that the present disclosure may also apply to other types of subsea systems 10 such as subsea injection systems (e.g., subsea gas injection system, subsea water injection system, and/or subsea carbon dioxide injection system).

Figure 2:
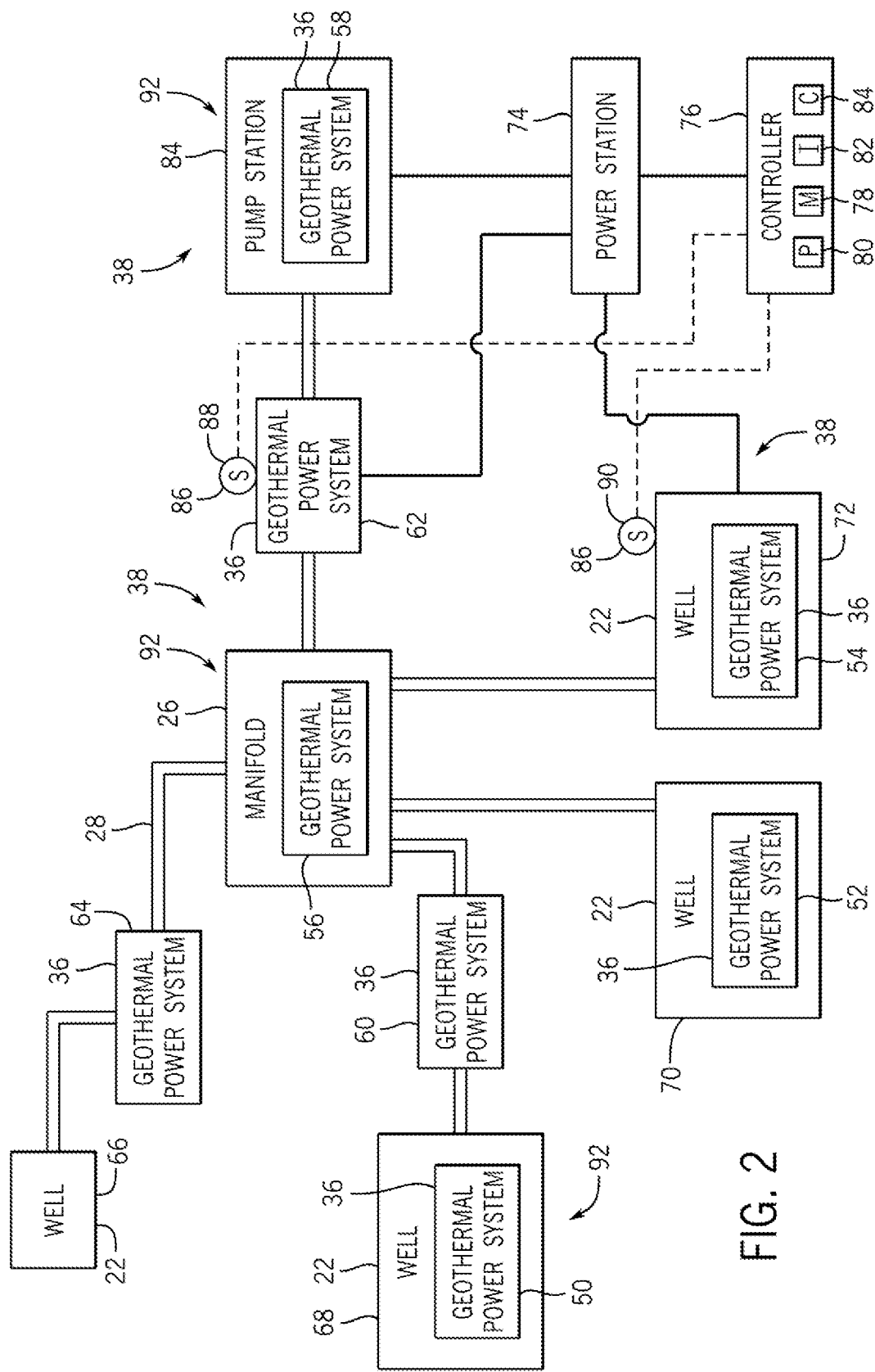
FIG. 2 is a schematic view of the subsea system of FIG. 1 having one or more geothermal power systems, according to an embodiment of the present disclosure.

FIG. 2 is a schematic view of the subsea system 10 of FIG. 1 having one or more geothermal power systems 36 (e.g., geothermal power systems 50, 52, 54, 56, 58, 60, 62, and 64) coupled to various subsea equipment 38 of the subsea system 10. In the illustrated embodiment, the subsea system 10 includes a plurality of wells 22 (e.g., wells 66, 68, 70, and 72) fluidly coupled to the manifold 26. The manifold 26 is fluidly coupled to the pump station 34, which pumps the production fluid produced by the wells 22 to the surface platform. As shown, the subsea system 10 also includes a power station 74 that may receive power from the surface platform and/or one or more of the geothermal power systems 36. Additionally or alternatively, the power station 58 may distribute power to the pump station 34, the manifold 26, hardware associated with the wells 22, and/or one or more of the geothermal power systems 36.

The subsea system 10 also includes a controller 76. The controller 76 includes a memory 78, a processor 80, instructions 82 stored on the memory 78 and executed by the processor 80, and communication circuitry 84. The subsea system 10 also includes one or more sensors 86 (e.g., sensors 88, 90) coupled to hardware (e.g., trees, valves, blow-out preventers (BOPs), etc.) associated with the wells 22 and/or the geothermal power systems 36, and communicatively coupled to the controller 76. The sensors 88 may include temperature sensors, pressure sensors, flow rate sensors, water content sensors, electrical load sensors, or a combination thereof. In certain embodiments, the sensors 86 may include additional sensors coupled to the manifold 26, the pump station 34, and/or the power station 74. In certain embodiments, the controller 76 may be communicatively coupled to the one or more geothermal power systems 36, the manifold 26, the pump station 34, and/or hardware associated with the one or more wells 22.

While the illustrated embodiment shows four wells 22 and eight geothermal power systems 36, it should be recognized that the subsea system 10 may include more or fewer wells 22 and/or geothermal power systems 36. For example, the subsea system 10 may include 1, 2, 3, 5, 6, 7, 8, 9, 10, or more wells 22 and/or 1, 2, 3, 4, 5, 6, 7, 9, 10, or more geothermal power systems 36. Additionally or alternatively, while the illustrated embodiment shows one manifold 26, one power station 74, and one controller 76, the subsea system 10 may include one or more manifolds 26, one or more power stations 74, and/or one or more controllers 76.

In the illustrated embodiment, the geothermal power systems 36 are shown as being distributed at different locations throughout the subsea system 10. As shown, one or more of the geothermal power systems 36 (e.g., geothermal power systems 50, 52, 54, 56, 58) may be coupled to a subsea station 92 fluidly coupled to one or more of the flow lines 28. For example, the geothermal power systems 50, 52, and 54 are coupled to subsea stations 92 (e.g., trees, blowout preventers, etc.) that are coupled to the wells 22. Additionally or alternatively, the geothermal power systems 36 may be coupled to subsea station 92 located away from the wells 22. For example, the geothermal power systems 56 and 58 are coupled to the manifold 26 and the pump station 34, respectively. Additionally or alternatively, the geothermal power systems 36 may be coupled to the flow lines 28 (e.g., fluid conduits or pipes) as standalone systems. For example, the geothermal power systems 60, 62, and 64 are shown as being fluidly coupled to the flow lines 28 as standalone units.

In certain embodiments, the geothermal power systems 36 may be configured to retrievably couple to the manifold 26, subsea station 92 associated with the wells 22, and/or the flow lines 28. That is, the geothermal power system 36 may be a retrievable module that may be configured to be retrieved by a remotely operated vehicle (ROV) or another device. In other embodiments, the geothermal power systems 36 may pre-installed in the subsea station 92 prior to installation of the hardware. Additionally or alternatively, the geothermal power systems 36 may include standalone non-retrievable structures. It should be recognized that the geothermal power systems 36 may include any combination of configurations described herein (e.g., retrievable, standalone, pre-installed, etc.).

The one or more of the geothermal power systems 36 may include a geothermal power plant configured to receive thermal energy from the flow lines 28. In certain embodiments, the geothermal power systems 36 may include a separator (e.g., see FIG. 6) fluidly coupled to the flow lines 28 and configured to separate the production flow in the flow lines 28 into water and production fluid. In certain embodiments, the geothermal power systems 36 may include dedicated geothermal wells drilled into the seabed 20 and a geothermal power plant fluidly coupled to the dedicated geothermal wells. In certain embodiments, the geothermal power systems 36 may include a combination of the configurations described herein (e.g., geothermal power plant, geothermal power plant and separator, geothermal wells and geothermal power plant). The geothermal power systems 36 are described in greater detail herein.

Figure 3:
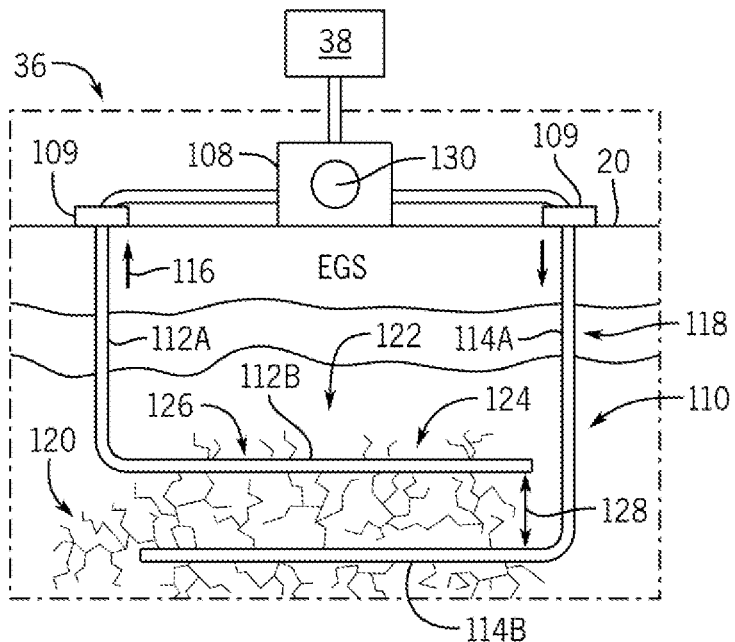
FIG. 3 is a schematic view of the geothermal power system of FIG. 2 having an enhanced geothermal system (EGS) configuration, according to an embodiment of the present disclosure.

FIG. 3 is a schematic view of the geothermal power system 36 of FIG. 2 having a geothermal power plant 108 and a plurality of geothermal wells 110 with an enhanced geothermal system (EGS) configuration, wherein the geothermal power plant 108 is coupled to and powers at least one subsea equipment 38. In certain embodiments, the geothermal power plant 108 and the subsea equipment 38 may be directly coupled or mounted together, the geothermal power plant 108 and the subsea equipment 38 may be mounted in close proximity to one another (e.g., within equal to or less than 1, 2, 3, 4, or 5 meters from one another), the geothermal power plant 108 and the subsea equipment 38 may be mounted in a vertical stack one over another, and/or the geothermal power plant 108 and the subsea equipment 38 may be mounted in horizontal side-by-side arrangement. Additionally, the geothermal power plant 108 and the subsea equipment 38 may be mounted in situ at a particular subsea station 92, the well 22, or other subsea equipment of the subsea system 10. In the illustrated embodiment, the geothermal power plant 108 and the subsea equipment 38 may be mounted in situ with the plurality of geothermal wells 110 in a subsea environment, such as along the sea floor 20. The subsea equipment 38 may include any mechanically driven and/or electrical driven equipment in the subsea system 10, as discussed below. In specific embodiments, the subsea equipment 38 includes one or more of a pump or pump station, a compressor or compressor station, a separation or separation station, a valve or arrangement of valves, a controller or control system, a sensor or monitoring system coupled to multiple sensors, an energy storage system (e.g., batteries, supercapacitors, etc.), or any combination thereof. In certain embodiments, the energy storage system is part of the geothermal power system 36.

In the illustrated embodiment, the geothermal power plant 108 is fluidly coupled to a plurality of geothermal well connections 109, which are configured to couple to the plurality of geothermal wells 110. As shown, the plurality of geothermal wells 110 include a producer well 112 (e.g., extraction well) and an injector well 114. The producer well 112 is configured to provide the geothermal power plant 108 with a flow of water 116 (or other thermal fluid) having thermal energy. Although water may be used as the thermal fluid, the geothermal power plant 108 may include any suitable liquid or gas as the thermal fluid (e.g., production fluid, gas, oil, chemicals, etc.). The geothermal power plant 108 is configured to receive thermal energy from the water 116 flowing from the producer well 112 and convert the received thermal energy into electrical and/or mechanical energy. The geothermal power plant 108 injects thermal energy-depleted water 116 into the injector well 114, which is configured receive thermal energy-depleted water from the geothermal power plant 108. Although the illustrated embodiment shows the plurality of geothermal wells 110 having a pair of geothermal wells 118 having one producer well 112 and one injector well 114, the plurality of geothermal wells 110 may include any number of pairs of geothermal wells 118. For example, the plurality of geothermal wells 110 may include 2, 3, 4, 5, 6, 7, 8, 9, 10 or more pairs of geothermal wells 118, where each pair of geothermal wells 118 has a producer well 112 and an injector well 114.

In the illustrated embodiment, the producer well 112 and the injector well 114 intersect a plurality of fractures 120 disposed beneath the seabed 20. The plurality of fractures 120 may be formed by conventional fracking methods. The plurality of fractures 120 increase a permeability of a rock formation 122 in the vicinity of a natural reservoir 124 of geofluid (e.g., water, hydrocarbons, etc.). The increase in permeability causes the formation of an artificial geothermal reservoir 126 from which the water 116 may be extracted. In certain embodiments, the producer well 112 and the injector well 114 are offset by a distance (e.g., a geological formation gap 128), thereby forming an open loop. The offset or gap 128 between the producer well 112 and the injector well 114 helps to maintain a temperature differential in the water 116 being extracted from the artificial geothermal reservoir 126 and the water being injected into the artificial geothermal reservoir 126. In the illustrated embodiment, each producer well 112 includes a generally vertical well portion 112A and a generally horizontal well portion 112B (e.g., lateral well portion), and each injector well 114 includes a generally vertical well portion 114A and a generally horizontal well portion 114B (e.g., lateral well portion). The offset or gap 128 may be generally between the horizontal well portions 112B and 114B.

In certain embodiments, the geothermal power plant 108 may include a pump 130 configured to pump the water 116 from the producer well 112, through the geothermal power plant 108, and into the injector well 114. In certain embodiments, the pump 130 may include a downhole pump (e.g., electrical submersible pump) positioned at the bottom of the producer well 112. In certain embodiments, the pump 130 may be coupled to the geothermal well connections 109 or located between the geothermal well connections 109 and the geothermal power plant 108. At the offset or gap 128, the water 116 flows through the geological formation from the injector well 114 to the producer well 112, wherein geothermal heat is transferred to the water 116. Thus, the water 116 flowing through the producer well 112 is generally hot, whereas the water 116 flowing through the injector well 114 is generally cold. The temperatures of the hot and cold water 116, and the temperature difference, may depend on the depth of the producer and injector wells 112 and 114 and other considerations. In some embodiments, the water 116 extracted from the producer well 112 may already have sufficient pressure to flow through the geothermal power plant 108, such that the pump 130 may be omitted.

In certain embodiments, the geothermal power plant 108 may convert the thermal energy received from the water 116 to electrical energy. In certain embodiments, the geothermal power plant 108 may be configured to power one or more systems or subsea equipment 38 of the subsea system 10. For example, the geothermal power system 36 may be configured to power the subsea equipment 38, including but not limited to the pump 130, a subsea pump, a subsea compressor, the pump station of the subsea system 10, a separator, a tree 14, valve actuators coupled to valves, BOP actuators coupled to BOPs, field extensions, the controller of the subsea system 10, the manifold 26, sensors and monitoring systems, communication systems, heaters (e.g., pipe heaters) or a combination thereof. In certain embodiments, the geothermal power system 36 may be configured to send power to the electrical cables (e.g., umbilical cables) to transfer power to the surface platform. In certain embodiments, the geothermal power plant 108 may convert the thermal energy received from the water 116 into mechanical energy. The mechanical energy may be used to power one or more machines located within the vicinity of the geothermal power plant 108, such as the pump 130, a compressor, a separator, and in certain embodiments, the pump station 34.

Figure 4:
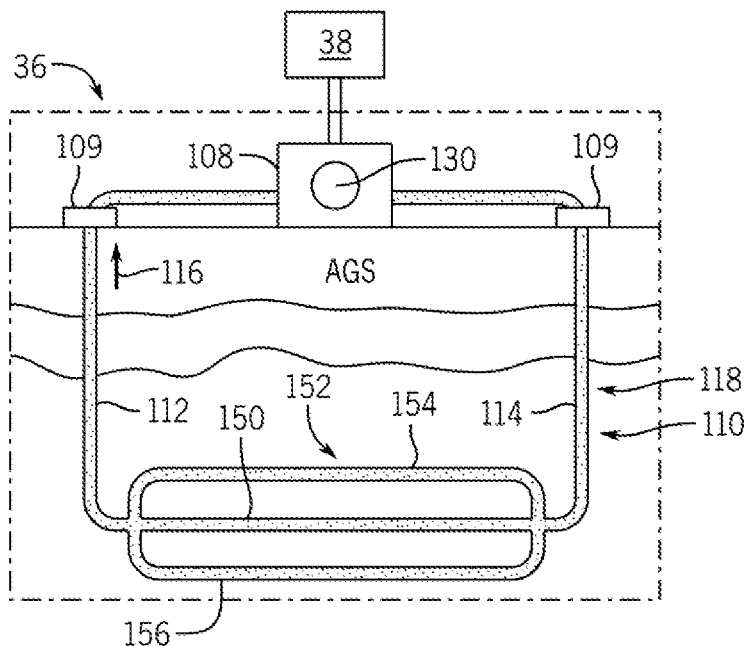
FIG. 4 is a schematic view of the geothermal power system of FIG. 2 having an advanced geothermal system (AGS) configuration, according to an embodiment of the present disclosure.

FIG. 4 is a schematic view of the geothermal power system 36 of FIG. 2 having a geothermal power plant 108 and a plurality of geothermal wells 110 with an advanced geothermal system (AGS) configuration, wherein the geothermal power plant 108 is coupled to and powers at least one subsea equipment 38. In certain embodiments, the geothermal power plant 108 and the subsea equipment 38 may be directly coupled or mounted together, the geothermal power plant 108 and the subsea equipment 38 may be mounted in close proximity to one another (e.g., within equal to or less than 1, 2, 3, 4, or 5 meters from one another), the geothermal power plant 108 and the subsea equipment 38 may be mounted in a vertical stack one over another, and/or the geothermal power plant 108 and the subsea equipment 38 may be mounted in horizontal side-by-side arrangement. Additionally, the geothermal power plant 108 and the subsea equipment 38 may be mounted in situ at a particular subsea station 92, the well 22, or other subsea equipment of the subsea system 10. In the illustrated embodiment, the geothermal power plant 108 and the subsea equipment 38 may be mounted in situ with the plurality of geothermal wells 110 in a subsea environment, such as along the sea floor 20. The subsea equipment 38 may include any mechanically driven and/or electrical driven equipment in the subsea system 10, as discussed below. In specific embodiments, the subsea equipment 38 includes one or more of a pump or pump station, a compressor or compressor station, a separation or separation station, a valve or arrangement of valves, a controller or control system, a sensor or monitoring system coupled to multiple sensors, an energy storage system (e.g., batteries, supercapacitors, etc.), or any combination thereof. In certain embodiments, the energy storage system is part of the geothermal power system 36.

In the illustrated embodiment, the geothermal power plant 108 is fluidly coupled to a plurality of geothermal well connections 109, which are configured to couple to the plurality of geothermal wells 110. As shown, the plurality of geothermal wells 110 include a producer well 112 and an injector well 114. The producer well 112 is configured to provide the geothermal power plant 108 with a flow of water 116 (or other thermal fluid) having thermal energy. Although water may be used as the thermal fluid, the geothermal power plant 108 may include any suitable liquid or gas as the thermal fluid. As discussed herein, the geothermal power plant 108 is configured to receive thermal energy from the water 116 flowing from the producer well 112 and convert the received thermal energy into electrical and/or mechanical energy. The geothermal power plant 108 injects thermal energy-depleted water 116 into the injector well 114, which is configured receive thermal energy-depleted water from the geothermal power plant 108. Although the illustrated embodiment shows the plurality of geothermal wells 110 having a pair of geothermal wells 118 having one producer well 112 and one injector well 114, the plurality of geothermal wells 110 may include any number of pairs of geothermal wells 118. For example, the plurality of geothermal wells 110 may include 2, 3, 4, 5, 6, 7, 8, 9, 10 or more pairs of geothermal wells 118, where each pair of geothermal wells 118 has a producer well 112 and an injector well 114.

In the illustrated embodiment, the producer well 112 and the injector well 114 are coupled to each other, thereby forming a main geothermal well 150 that is closed loop. In the illustrated embodiment, the geothermal power system 36 also includes branch geothermal wells 152 (e.g., branch geothermal wells 154, 156) that branch off of the main geothermal well 150. The branch geothermal wells 152 are also closed loop, that is, they are formed a closed loop with the main geothermal well 150. Although the illustrated embodiment shows two branch geothermal wells 152, the geothermal power system 36 may include 1, 3, 4, 5, 6, 7, 8, 9, or more branch geothermal wells 152. The water 116 within the main geothermal well 150 and the plurality of branch geothermal wells 152 may absorb heat from the surrounding geological formation 158. Thus, the plurality of geothermal wells 110 having the AGS configuration may function similarly to a heat exchanger. In certain embodiments, the geothermal power system 36 may include a combination of one or more pairs of geothermal wells 118 having the EGS configuration and one or more pairs of geothermal wells 118 having the AGS configuration.

In certain embodiments, the geothermal power plant 108 may include a pump 130 configured to pump the water 116 from the producer well 112, through the geothermal power plant 108, and into the injector well 114. At the main geothermal well 150 and the branch geothermal wells 152, the geological formation 158 transfers geothermal heat to the water 116. Thus, the water 116 flowing through the producer well 112 is generally hot, whereas the water 116 flowing through the injector well 114 is generally cold. The temperatures of the hot and cold water 116, and the temperature difference, may depend on the depth of the producer and injector wells 112 and 114 and other considerations. In some embodiments, the water 116 extracted from the producer well 112 may already have sufficient pressure to flow through the geothermal power plant 108, such that the pump 130 may be omitted.

In certain embodiments, the geothermal power plant 108 may convert the thermal energy received from the water 116 to electrical energy. In certain embodiments, the geothermal power plant 108 may be configured to power one or more systems or subsea equipment 38 of the subsea system 10. For example, the geothermal power system 36 may be configured to power the subsea equipment 38, including but not limited to the pump 130, a subsea pump, a subsea compressor, the pump station of the subsea system 10, a separator, a tree 14, valve actuators coupled to valves, BOP actuators coupled to BOPs, field extensions, the controller of the subsea system 10, the manifold 26, sensors and monitoring systems, communication systems, heaters (e.g., pipe heaters), or a combination thereof. In certain embodiments, the geothermal power system 36 may be configured to send power to the electrical cables (e.g., umbilical cables) to transfer power to the surface platform. In certain embodiments, the geothermal power plant 108 may convert the thermal energy received from the water 116 into mechanical energy. The mechanical energy may be used to power one or more machines located within the vicinity of the geothermal power plant 108, such as the pump 130, a compressor, a separator, and in certain embodiments, the pump station 34.

In certain embodiments, one or more geothermal power plants 108 may fluidly couple to one or more dedicated geothermal manifolds configured to redirect and/or merge one or more geofluid lines. In certain embodiments, the geothermal manifolds may be located proximate to or coupled to one or more manifolds used for production fluid. That is, in certain embodiments a unified manifold may be used for both production fluid and geofluid used by the one or more geothermal power plants 108.

Figure 5:
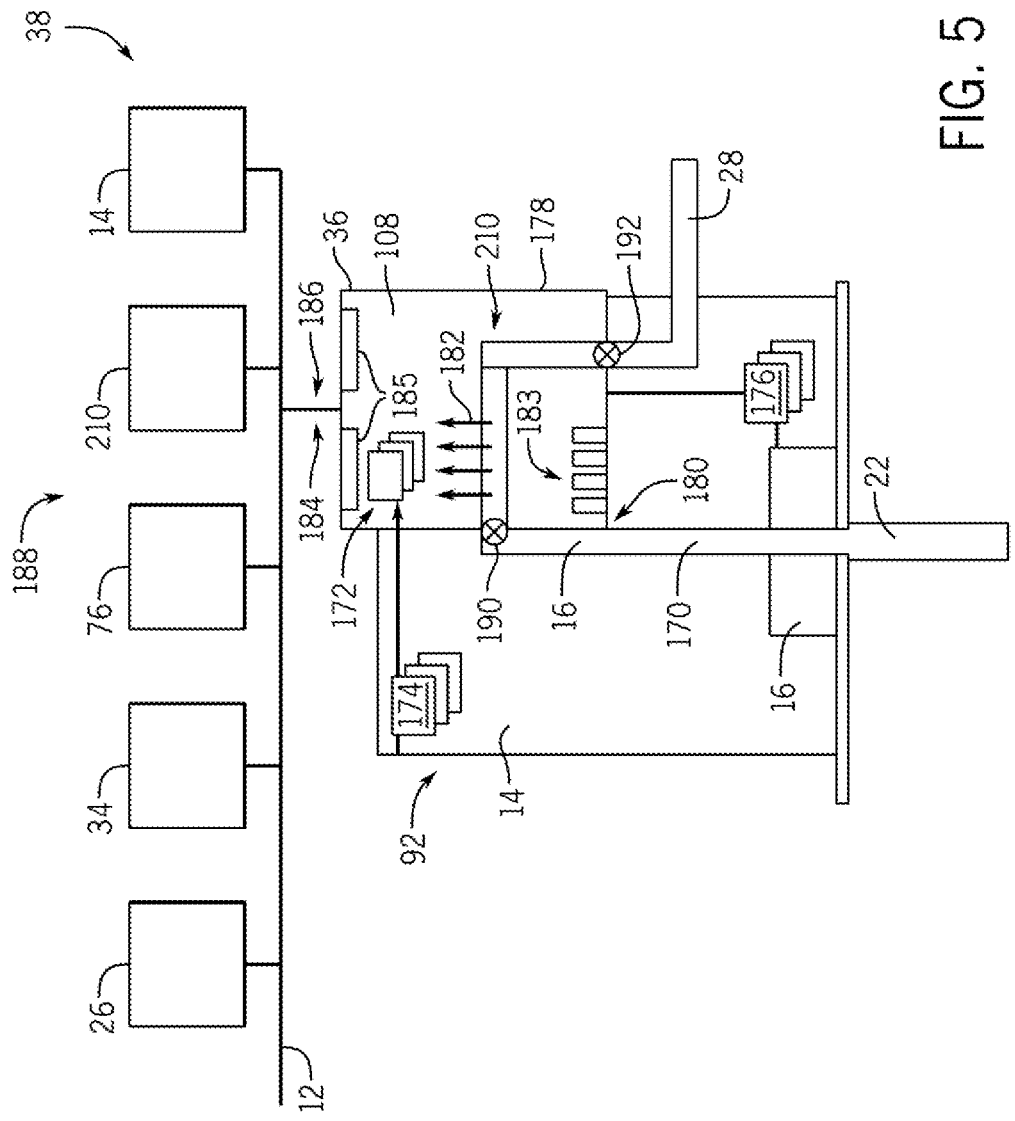
FIG. 5 is a schematic view of the geothermal power system of FIG. 2 retrievably coupled to a portion of a production flow line, according to an embodiment of the present disclosure.

FIG. 5 is a schematic view of the geothermal power system 36 of FIG. 2 retrievably coupled to a portion 180 (e.g., receptacle) of the subsea station 92 along a fluid flow path 170 through the subsea station 92, wherein the fluid flow path 170 couples to a flow line 28. In the illustrated embodiment, the geothermal power system 36 includes the geothermal power plant 108, which may include a plurality of components 172 configured to convert energy (e.g., thermal energy) of the fluid flow into power (e.g., electrical power and/or mechanical power). For example, as discussed in detail below with reference to FIG. 7, the components 172 may include a fluid flow circuit (e.g., fluid flow loop), heat exchangers along the fluid flow circuit, a turbine driven by fluid flow along the fluid flow circuit, and an electrical generator driven by the turbine. In certain embodiments, the geothermal power system 36 is configured to generate power (e.g., electrical power and/or mechanical power) to operate various components coupled to and/or integrated within the subsea station 92, such as components 174 coupled to the subsea tree 14 and/or components 174 coupled to the wellhead 16. In certain embodiments, the components 172, 174, and/or 176 may include a separator configured to separate liquids, gases, and/or solids from one another. The separator may include a cyclone or centrifugal separator, a gravity separator, a filter separator, a scrubber, a vertical pressure vessel separator, a horizontal pressure vessel separator, a two-phase separator, a three-phase separator, or any combination thereof. For example, the separator may separate different liquids from one another, different gases from one another, gases from liquids, gases from solids, liquids from solids, or any combination thereof. In certain embodiments, the separator may separate water from production fluid (e.g., oil). An example configuration with a separator 210 is discussed in detail below with reference to FIG. 6. The separator 210 may be coupled to the geothermal power system 36 or, in certain embodiments, another structure separate from the geothermal power system 36. In certain embodiments, the components 172, 174, and/or 176 may include a controller (e.g., a controller having a processor, memory, communication circuitry, etc.) configured to control equipment at the subsea station 92, sensors (e.g., pressure, temperature, fluid composition, water content, etc.), compressors, pumps, valves (e.g., valves actuated by electric actuators), chemical injection metering valve (CIMV) modules for controlling the injection of chemicals, downhole tools, safety/emergency systems, or any combination thereof, coupled to and powered by the geothermal power system 36.

As shown, the geothermal power system 36 may have a retrievable housing 178 (e.g., retrievable process module or RPM) that is retrievably coupled to the subsea station 92 (e.g., the subsea tree 14) at the portion 180, wherein the retrievable housing 178 and the portion 180 may include a plurality of releasable connections 183. The releasable connections 183 may include one or more of a mechanical connector, a fluid connector, an electrical connector, or any combination thereof. For example, the mechanical connector may include mating mechanical connectors, such as a hook and slot connector, clamps, threaded fasteners, rotating connectors, or any combination thereof. By further example, the electrical connectors may include one or more mating electrical connectors, such as male and female electrical connectors, which may connect and release via an axial push or pull, a rotational twist, a threaded connection, a hinged connection, or any combination thereof. By further example, the fluid connectors may include mating fluid connectors, such as male and female fluid connectors, which may connect and release via an axial push or pull, a rotational twist, a threaded connection, a hinged connection, or any combination thereof. In certain embodiments, the geothermal power system 36 also may include ROV connectors 185, such that an ROV can connect to the ROV connectors 185 for installation or removal of the geothermal power system 36. In certain embodiments, the ROV connectors 185 may include actuators to engage or release the various releasable connections 183. For example, the ROV may be configured to push, pull, rotate, or otherwise move at least one of the ROV connectors 185 to engage or release the various releasable connections 183.

In the illustrated embodiment, the subsea station 92 includes the subsea tree 14 coupled to the well 22 via the wellhead 16. In certain embodiments, the subsea station 92 may be located away from the well 22. For example, the subsea station 92 may include the manifold 26, the pump station 34, or a combination thereof. In certain embodiments, the manifold 26 may include a production fluid manifold configured to merge and/or redirect production fluid. Additionally or alternatively, as discussed herein, the manifold 26 may include a geothermal fluid manifold configured to merge and/or redirect geofluid (e.g., water) used for geothermal power generation. Although the illustrated embodiment shows the geothermal power system 36 being retrievable from the subsea station 92, in certain embodiments the geothermal power system 36 may be pre-installed on the subsea station 92 as discussed herein.

In the illustrated embodiment, the geothermal power system 36 is configured to receive thermal energy 182 from the production fluid (e.g., hydrocarbon fluid, such as oil, gas, etc.) flowing through the fluid flow path 170. In certain embodiments, the geothermal power system 36 may receive thermal energy from a flow of geofluid (e.g., geothermally heated water or other thermal fluid) in a geofluid line separated from the fluid flow path 170. The geothermal power system 36 is also configured to convert the thermal energy 182 received from the production fluid into electrical energy 184 and/or mechanical energy 186 via the geothermal power plant 108. In certain embodiments, the geothermal power system 36 is coupled to the subsea station 92 of any type of well 22, including but not limited to hydrocarbon production wells (e.g., oil and/or gas wells), geothermal wells, carbon capture and storage (CCS) wells, any combination thereof. However, regardless of the type of well 22, the geothermal power plant 108 receives thermal energy from the fluid flow in and/or out of the wells 22.

In the illustrated embodiment, the geothermal power system 36 is configured to distribute the electrical energy 184 and/or the mechanical energy 186 to one or more power consumers 188 of the subsea system 10 and/or the components 174 and 176. For example, the geothermal power system 36 may be configure to transmit electrical energy 184 to the manifold 26, the pump station 34, the controller 76, the separator 210, the tree 14, the field extensions, and/or the electrical cables 12 (e.g., umbilical cables). Additionally or alternatively, the geothermal power system 36 may be configured to transfer mechanical energy 186 to one or more power consumers 188 having moving parts, such as the separator 210, compressors, pumps, and/or the pump station 34.

In certain embodiments, the geothermal power system 36 may be configured to clamp onto an exterior portion of an already-existing flow line 28. In certain embodiments, the geothermal power system 36 may be configured to couple to one or more valves of the subsea station 92. The subsea station 92 may be configured to internally re-route the production flow to flow into the geothermal power system 36 via a first valve 190 and out of the geothermal power system 36 via a second valve 192. Thus, the geothermal power system 36 may be fluidly coupled to the fluid flow path 170 or fluidly separate (i.e., isolated) from the fluid flow path 170. In either case, the geothermal power system 36 is thermally coupled to the fluid flow path 170, thereby enabling heat transfer of the thermal energy 182 to generate power as the electrical energy 184 and/or the mechanical energy 186.

Figure 6:
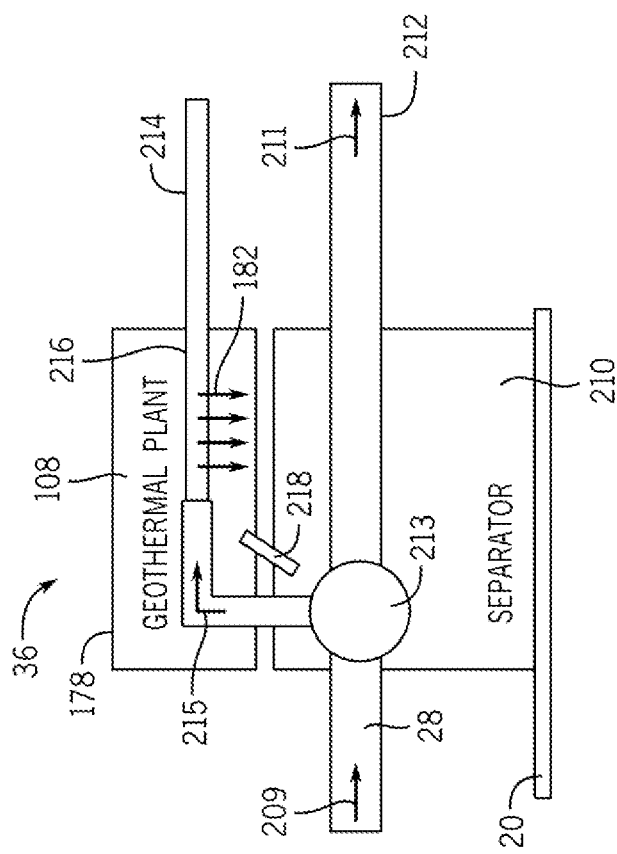
FIG. 6 is a schematic view of the geothermal power system of FIG. 2 configured to power a separator, according to an embodiment of the present disclosure.

FIG. 6 is a schematic view of the geothermal power system 36 of FIG. 2 configured to power a separator 210. As shown, the geothermal power system 36 includes the separator 210 (e.g., subsea separator) coupled to the fluid flow path 170 and/or the flow line 28 carrying the production flow. In certain embodiments, the geothermal power plant 108 may be directly coupled or mounted to the separator 210, the geothermal power plant 108 may be mounted in close proximity to the separator 210 (e.g., within equal to or less than 1, 2, 3, 4, or 5 meters from the separator 210, the geothermal power plant 108 and the separator 210 may be mounted in a vertical stack one over another, and/or the geothermal power plant 108 and the separator 210 may be mounted in horizontal side-by-side arrangement. Additionally, the geothermal power plant 108 and the separator 210 may be mounted in situ at a particular subsea station 92, well 22, or other subsea equipment of the subsea system 10.

In certain embodiments, the separator 210 includes a cyclone or centrifugal separator, a gravity separator, a filter separator, a scrubber, a vertical pressure vessel separator, a horizontal pressure vessel separator, a two-phase separator, a three-phase separator, or any combination thereof. The separator 210 may separate different liquids from one another, different gases from one another, gases from liquids, gases from solids, liquids from solids, or any combination thereof. In certain embodiments, the separator may separate water from production fluid (e.g., oil). For example, the separator 210 may be configured to separate a raw production fluid flow 209 into a treated production fluid flow 211 (e.g., hydrocarbons) in a production flow line 212 and a separated fluid flow 215 (e.g., water 116) in a separated flow line 214 (e.g., water flow line) that branches off from the flow line 28 at a junction 213. As shown, the geothermal power system 36 also includes the geothermal power plant 108 coupled to a portion 216 of the separated flow line 214. The geothermal power plant 108 is configured to receive thermal energy 182 from the separated fluid flow 215 (e.g., water 116) in the separated flow line 214. The geothermal power plant 108 is also configured to power the separator 210 using the thermal energy 182 received from the separated flow line 214.

Figure 7:
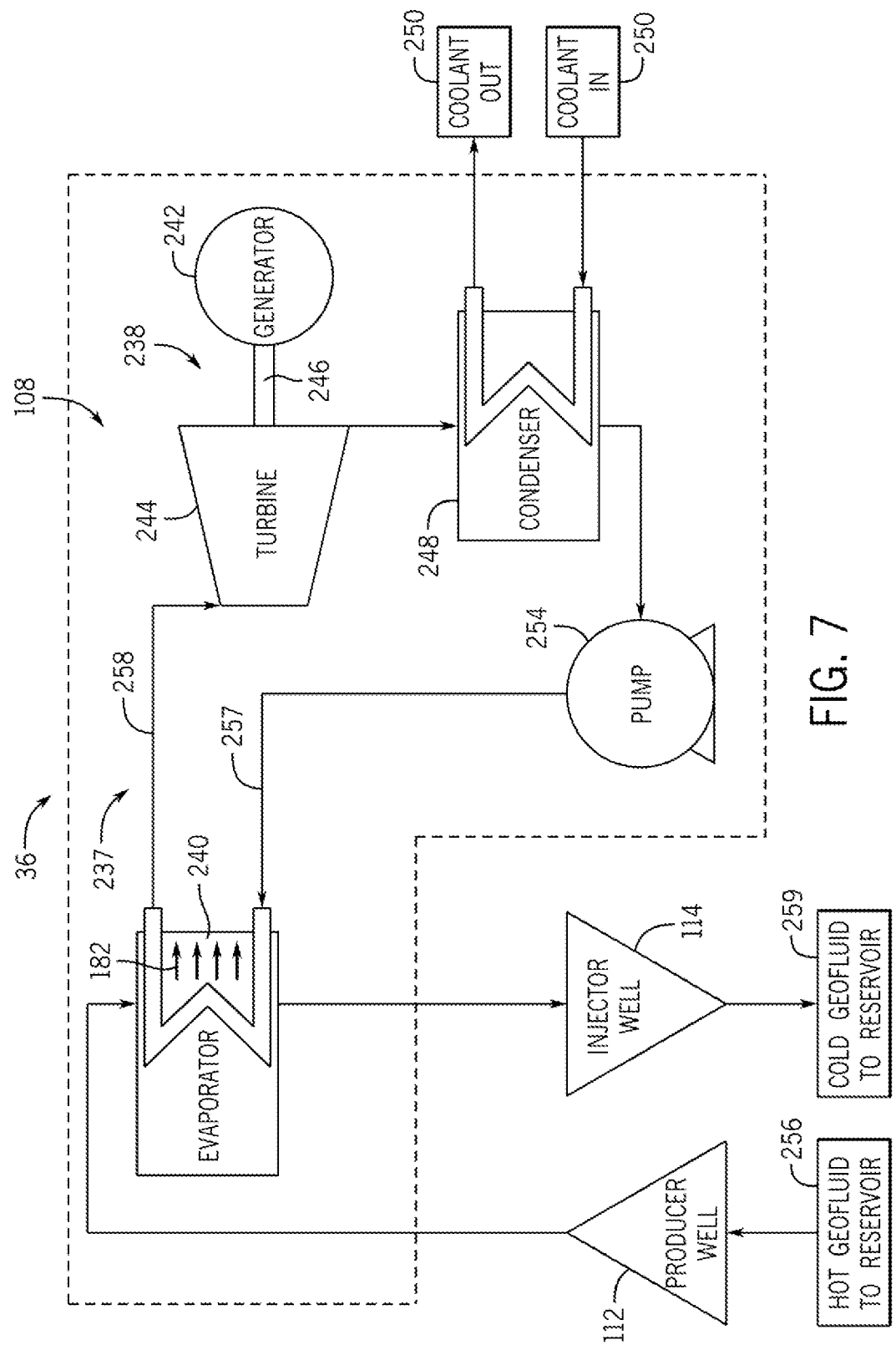
FIG. 7 is a schematic view of a high-level architecture of the geothermal power system of FIG. 3 and FIG. 4, according to an embodiment of the present disclosure.

In certain embodiments, the geothermal power plant 108 is configured to convert the received thermal energy 182 into the electrical energy 184 via an evaporator 240 (e.g., heat exchanger), a condenser 248 (e.g., heat exchanger), a turbine 244, and a generator 242 of the geothermal power plant 108 (e.g., see FIG. 7). The geothermal power plant 108 may be configured to power the separator 210 using the electrical energy 184. For example, the geothermal power plant 108 may transmit the electrical energy 184 to the separator 210 via one or more electrical wires (e.g., energy transmission 218). In other embodiments, the geothermal power plant 108 may generate mechanical energy 186 via the turbine 244 and may transmit the mechanical energy 186 to the separator 210 via a shaft and/or one or more gears (e.g., energy transmission 218) coupling the turbine 244 with the separator 210. In certain embodiments, the geothermal power plant 108 may transmit a combination of the electrical energy 184 and the mechanical energy 186 to the separator 210.

Although the illustrated embodiment shows the separator 210 as being proximate to the geothermal power plant 108, in certain embodiments the separator 210 may be located away (e.g., disjoint) from the geothermal power plant 108. For example, the geothermal power plant 108 and the separator 210 may be disposed in a single packaged and/or retrievable unit. Additionally or alternatively, the packaged and/or retrievable unit may include the geothermal power plant, the separator, an energy storage system, one or more sensors, a controller, or any combination thereof. It should be recognized that any component (e.g., the separator, the geothermal power plant, etc.) disposed within the packaged and/or retrievable unit may be appropriately sized to fit within the packaged and/or retrievable unit. In certain embodiments, the geothermal power plant 108 and the separator 210 may be disposed in separate units. Additionally, although the illustrated embodiment shows the separator 210 contacting the seabed 20, in certain embodiments the separator 210 may not contact the seabed 20.

In certain embodiments, the geothermal power system 36 (e.g., having the geothermal power plant 108 and the separator 210) may be coupled to a subsea hardware or equipment fluidly coupled to one or more of the flow lines 28. For example, the subsea hardware may include a tree, a production manifold configured to redirect (e.g., merge) one or more flow lines 28 of production fluid, and/or a geothermal manifold configured to redirect one or more geothermal flow lines (e.g., flow lines 214). In certain embodiments, the geothermal power system 36 may be coupled to subsea hardware or equipment located away from the wells 22. Additionally or alternatively, the geothermal power system 36 may be coupled to the flow line 28 as a standalone system.

In certain embodiments, the geothermal power system 36 may be configured to retrievably couple to the manifold, subsea hardware associated with the wells 22, and/or the flow lines 28. That is, the geothermal power system 36 may be a retrievable module (e.g., retrievable housing 178) that may be configured to be retrieved by the ROV or another device. In certain embodiments, the geothermal power system 36 may pre-installed in the subsea hardware prior to installation of the hardware. In certain embodiments, a portion or subsystem of the geothermal power system 36 may be retrievable while a main body of the geothermal power system 36 remains in place. For example, the geothermal power plant 108, the separator 210, or a combination thereof, may be retrievable from a subsea structure. Additionally or alternatively, the geothermal power system 36 may include standalone non-retrievable structures. It should be recognized that the geothermal power system 36 may include any combination of configurations described herein (e.g., retrievable, standalone, pre-installed, etc.).

Although the illustrated embodiment shows the geothermal power system 36 having a single geothermal power plant 108 and a single separator 210, the geothermal power system 36 may have one or more geothermal power plants 108 and/or one or more separators 210. For example, the geothermal power system 36 may include multiple separators 210 as part of a multi-step separation (e.g., filtering) process of the production flow. Additionally or alternatively, the geothermal power system 36 may include one or more geothermal power plants 108 in order to maximize an amount of thermal energy 182 received from the separated geofluid line.

The subsea system 10 may include any combination of the types of geothermal power systems 36 discussed herein. That is, the subsea system 10 may include one or more geothermal power systems 36 that retrievably couple to a subsea module (e.g., retrievable process modules), one or more geothermal power systems 36 that include dedicated geothermal wells 22 fluidly coupled to a geothermal power plant 108, one or more geothermal power systems 36 that include a geothermal power plant 108 packaged with a separator 210, or any combination thereof.

FIG. 7 is a schematic view of a high-level architecture of the geothermal power system 36 of FIGS. 1-6. In the illustrated embodiment, the geothermal power system 36 includes the producer well 112, the injector well 114, and the geothermal power plant 108. The geothermal power plant 108 also includes a plurality of subsystems 238, including an evaporator 240 (e.g., heat exchanger or heater) fluidly coupled to the producer well 112 and the injector well 114. The subsystems 238 of the geothermal power plant 108 also include a generator 242 coupled to and driven by a turbine 244, which is fluidly coupled to the evaporator 240. As illustrated, the geothermal power plant 108 has the evaporator 240, the turbine 244, the condenser 248, and a pump 254 arranged in a fluid circuit 237. The turbine 244 includes a shaft 246 that is coupled to the generator 242. The subsystems 238 also include the condenser 248 that is fluidly coupled to the turbine 244. The condenser 248 is configured to receive and output a coolant 250. The subsystems 238 also include the pump 254 fluidly coupled to the condenser 248. As shown, the pump 254 is disposed between the condenser 248 and the evaporator 240.

As shown, the producer well 112 produces hot geofluid 256 (e.g., mostly water, some hydrocarbons, dissolved minerals, etc.), which is received by the geothermal power plant 108 of the geothermal power system 36. The hot geofluid 256 is received by the evaporator 240, which is configured to receive the thermal energy 182 from the hot geofluid 256 and use the thermal energy 182 to heat a fluid 257 (e.g., thermal fluid) flowing through the evaporator 240 and the entire fluid circuit 237. The fluid 257 may include any suitable working fluid, such as water and/or steam. The evaporator 240 is configured to heat the fluid 257 to produce a heated water and/or steam 258. The evaporator 240 outputs cold geofluid 259 for return back into the injector well 114.

The heated water and/or steam 258 is received by the turbine 244 and used to drive (e.g., rotate or spin) the turbine 244, the shaft 246, and the generator 242, thereby generating electricity. The electricity generated by the generator 242 may be sent to one or more subsea stations 92 of the subsea system 10 (e.g., the controller, the manifold, the pump station, the tree, etc.). The heated water and/or steam 258 exits the turbine 244 and enters the condenser 248, which cools the heated water and/or steam 258 to produce a cooled fluid 257 (e.g., water or condensate) via heat transfer with the coolant 250 flowing through the condenser 248. The cooled fluid 257 is pumped back to the evaporator 240 via the pump 254, where the cycle is repeated to recover heat from the hot geofluid 256 to generate electricity.

In certain embodiments, the pump 254 of the geothermal power plant 108 may be powered by electricity generated by the generator 242 and/or mechanically powered via the shaft 246 of the turbine 244. As discussed herein, the geothermal power plant 108 may be configured to export electricity generated by the generator 242 and/or mechanical energy transferred by the shaft 246 to one or more subsea stations 92 of the subsea system 10.

Although the illustrated embodiment shows the geothermal power plant 108 having one of each of the subsystems 238 (e.g., the evaporator 240, the generator 242, the turbine 244, the condenser 248, the pump 254, the geothermal power plant 108 may include one or more of each of the subsystems 238. For example, the geothermal power plant 108 may include 2, 3, 4, 5, 6, 7, 8, 9, or any suitable number of each of the subsystems 238. Additionally, although the illustrated embodiment shows the geothermal power system 236 having a pair of geothermal wells 118 having one producer well 112 and one injector well 114, in certain embodiments the geothermal power system 236 may include 2, 3, 4, 5, 6, 7, 8, 9, or any suitable number of pairs of geothermal wells 118.

Figure 8:
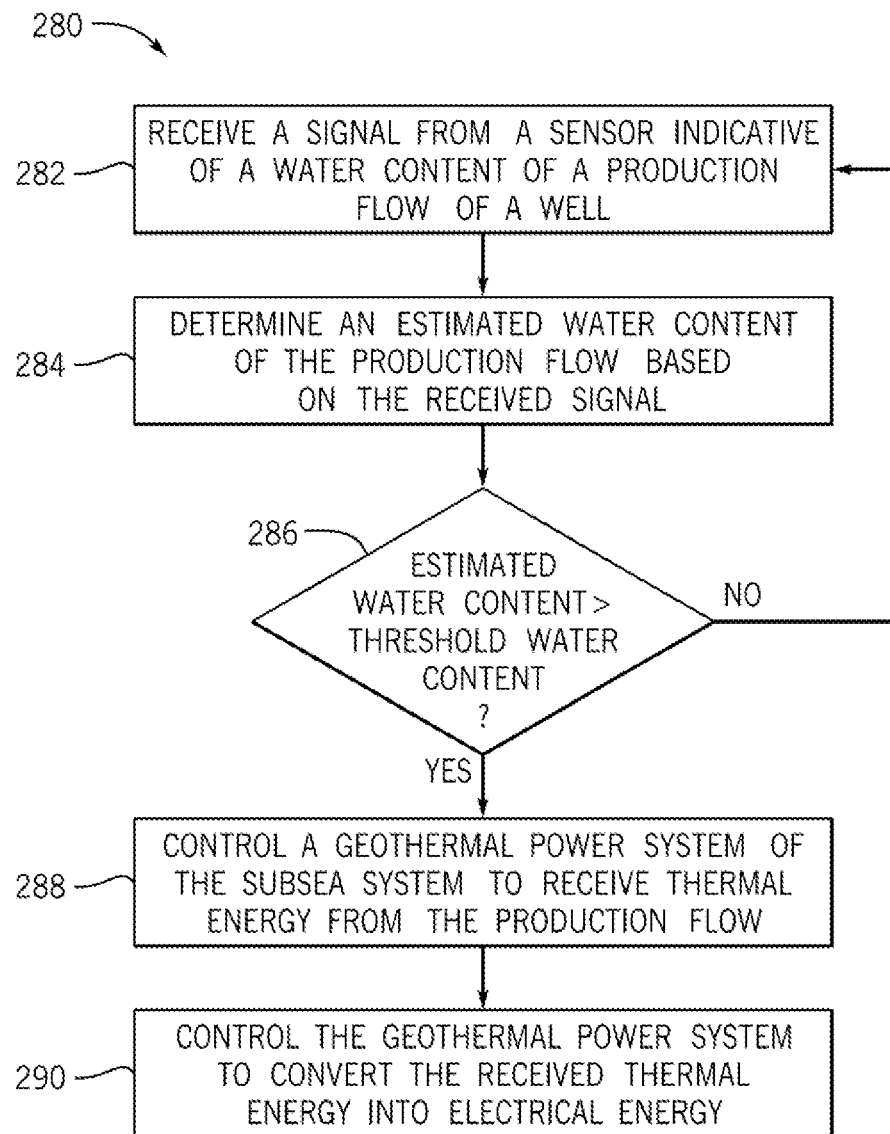
FIG. 8 is a flowchart of an example process for activating the geothermal power system of FIG. 2, according to an embodiment of the present disclosure.

FIG. 8 is a flowchart of an example process 280 for operating the geothermal power system of FIG. 2. The process 280 may be performed by a processor-based computing device or controller disclosed above with reference to FIG. 2 or any other suitable computing device(s) or controller(s). Furthermore, the blocks of the process 280 may be performed in the order disclosed herein or in any other suitable order. For example, certain blocks of the process 280 may be performed concurrently. In addition, in certain embodiments, at least one of the blocks of the process 280 may be omitted.

In block 282 of the process 280, a processor of a controller receives a signal from a sensor disposed in the subsea system 10 indicative of a water content (e.g., per volume content) of the production flow from a well (e.g., production well, hydrocarbon well). In certain embodiments, the sensor may direct a waveform signal (e.g., microwave) at a portion of the production flow to determine one or more characteristics of the fluid (e.g., permittivity, conductivity). In block 284 of the process 280, the processor determines an estimated water content of the production flow based on the signal received from the sensor.

In block 286 of the process 280, in response to the estimated water content of the production flow exceeding a threshold water content, the processor controls (e.g., instructs) a geothermal power system 36 of the subsea system 10 to receive thermal energy from the production flow flowing through a flowline. That is, the geothermal power system 36 is activated (e.g., initiated) to begin receiving thermal energy in response to the estimated water content of the production flow exceeding a threshold water content value. For example, the threshold water content may be more than 10, 20, 30, 40, 50, 60, 70, 80, or 90 percent of the production flow being water.

In block 288 of the process 280, in response to the estimated water content of the production flow exceeding the threshold water content, the processor controls the geothermal power system 36 to convert the received thermal energy into electrical energy and/or mechanical energy. In certain embodiments, the processor controls a separator of the geothermal power system to separate water into a separate water line from the production flow. In block 290 of the process 280, the processor may control the geothermal power system 36 to receive thermal energy from the separated water, thereby converting the received thermal energy into electrical energy and/or mechanical energy.

In certain embodiments, the processor may control the geothermal power system 36 to send the electrical energy to one or more subsea stations 92 and/or subsea equipment 38 (e.g., subsea hardware, power consumers). In certain embodiments, the one or more subsea stations 92 and/or subsea equipment 38 may include a tree, a manifold, a pump station configured to pump the production flow to a surface platform, a controller, a field extension, an electrical cable (e.g., umbilical cable) configured to send electrical energy to a surface platform, or a combination thereof.

In certain embodiments, the processor may be configured to monitor an operational status and/or operational parameters of the one or more power consumers (e.g., subsea stations 92 and/or subsea equipment 38). The processor may estimate an amount of power to be consumed by the one or more power consumers based on the monitored one or more operational parameters. In certain embodiments, the processor may control a distribution of the electrical energy and/or the mechanical energy from the geothermal power system 36 to the one or more power consumers based on the one or more operational parameters and/or the estimated power to be consumed.

Figure 9:
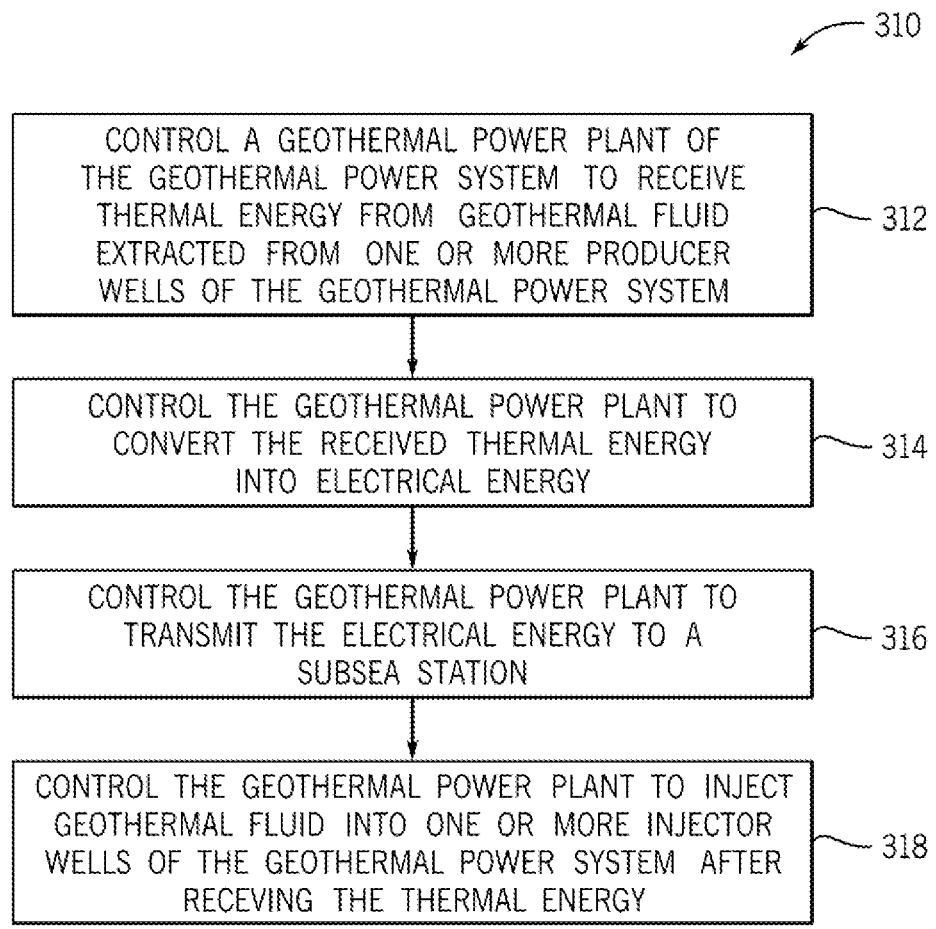
FIG. 9 is a flowchart of an example process for operating a geothermal power plant of the geothermal power system of FIG. 2, according to an embodiment of the present disclosure.

FIG. 9 is a flowchart of an example process 310 for operating the geothermal power plant 108 of the geothermal power system 36 of FIG. 2. The process 310 may be performed by a processor-based computing device or controller disclosed above with reference to FIG. 2 or any other suitable computing device(s) or controller(s). Furthermore, the blocks of the process 310 may be performed in the order disclosed herein or in any other suitable order. For example, certain blocks of the process 310 may be performed concurrently. In addition, in certain embodiments, at least one of the blocks of the process 310 may be omitted.

In block 312 of the process 310, the processor of the controller may control a geothermal power plant 108 of the geothermal power system 36 to receive thermal energy from geofluid (e.g., water) extracted from one or more of the producer wells of the geothermal power system 36. For example, the processor may control one or more actuators that allow the geofluid to flow into the geothermal power plant 108, thereby allowing the thermal energy of the geofluid to be transferred to a fluid cycling through the geothermal power plant 108.

In block 314 of the process 310, the processor controls the geothermal power plant 108 to convert the received thermal energy into electrical energy. For example, the processor may send instructions to a turbine of the geothermal power plant 108 to receive the heated fluid (e.g., steam) from the evaporator. Additionally or alternatively, the processor may send instructions to a generator and/or the turbine to distribute the generated power between generating electrical energy via the turbine and generating mechanical energy via a shaft of the turbine. In block 316 of the process 310, the processor controls the geothermal power plant 108 to transmit the electrical energy and/or the mechanical energy to a pumping station of the subsea system 10.

In block 318 of the process 310, the processor controls the geothermal power plant 108 to inject the geofluid (e.g., thermal energy-depleted water) into one or more injection wells (e.g., injector wells) of the geothermal power system 36. For example, the processor may control a pump configured to pump the geofluid out of the producer well, through the geothermal power plant 108, and into the injector well. In certain embodiments, the injector well may be offset from the producer well (e.g., EGS configuration). In other embodiments, the injector well may form a closed loop with the producer well (e.g., AGS configuration). In certain embodiments, the geothermal power system 36 may include wells have the EGS configuration, the AGS configuration, or a combination thereof.

In certain embodiments, the processor receives a signal from a sensor disposed in the subsea system 10 indicative of a temperature of the geofluid (e.g., water) flowing from one or more of the geothermal producer wells (e.g., extraction wells). The processor may be configured to determine an estimated temperature of the water flowing from the one or more geothermal producer wells based on the signal. In certain embodiments, the processor may actuate an actuator assembly to adjust a flow rate of the water flowing from the one or more producer wells in response to the estimated temperature falling below a threshold temperature. For example, the processor may be configured to actuate the actuator assembly to further open a valve to increase the flow rate of the geofluid in response to the estimated temperature falling below the threshold temperature. By increasing the flow rate of the geofluid, the rate at which thermal energy is drawn from the geofluid by the geothermal power plant 108 may be maintained (e.g., kept near constant). Furthermore, in certain embodiments, the process 310 may vary (e.g., increase or decrease) the flow rate of the geofluid to vary (e.g., increase or decrease) the heat transfer to the geothermal power plant 108, thereby varying (e.g., increasing or decreasing) the power production for use by the various subsea stations 92 and/or subsea equipment 38.

Figure 10:
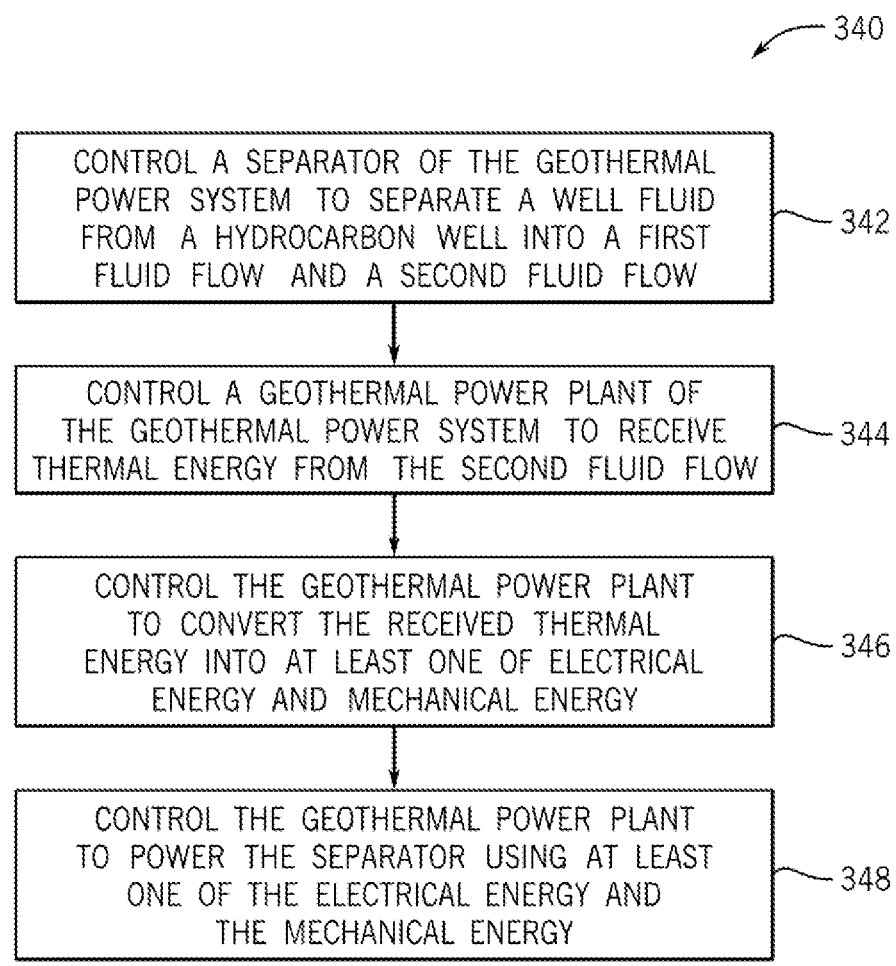
FIG. 10 is a flowchart of an example process for operating the geothermal power system of FIG. 2, according to an embodiment of the present disclosure.

FIG. 10 is a flowchart of an example process 340 for operating the geothermal power system of FIG. 2. The process 340 may be performed by a processor-based computing device or controller disclosed above with reference to FIG. 2 or any other suitable computing device(s) or controller(s). Furthermore, the blocks of the process 340 may be performed in the order disclosed herein or in any other suitable order. For example, certain blocks of the process 340 may be performed concurrently. In addition, in certain embodiments, at least one of the blocks of the process 340 may be omitted.

In block 342 of the process 340, a processor of the controller is configured to control a separator of the geothermal power system 36 to separate a production flow in a flow line (e.g., main flow line) into a production fluid flow (e.g., hydrocarbon flow) in a production flow line and a geofluid flow (e.g., water flow) in a geofluid flow line. In certain embodiments, the separator is located at a junction of the flow line, the production flow line, and the geofluid flow line. In certain embodiments, the geofluid flow line branches off from the flow line, and the production flow line is axially aligned with the flow. In block 344 of the process 340, the processor controls the geothermal power plant 108 to receive thermal energy from the geofluid flow in the geofluid flow line. Additionally or alternatively, the processor may control the geothermal power plant 108 to receive thermal energy from the production fluid flow in the production flow line.

In block 346 of the process 340, the processor controls the geothermal power plant 108 to convert the received thermal energy into electrical energy and/or mechanical energy. In certain embodiments, the controller may be configured to adjust a ratio between the amount of electrical energy and the amount of mechanical energy produced by the geothermal power plant 108. For example, the controller may be configured to adjust one or more parameters of a generator of the geothermal power plant 108 and/or adjust a transmission used in conjunction with a shaft of a turbine of the geothermal power plant 108.

In block 348 of the process 340, the processor controls the geothermal power system to power the separator using the electrical energy and/or the mechanical energy generated by the geothermal power plant 108. Additionally, the processor may instruct the geothermal power system 36 to distribute the electrical energy and/or the mechanical energy generated by the geothermal power plant 108 to one or more subsea stations 92. In certain embodiments, extra electrical energy generated by the geothermal power plant 108 may be stored in one or more batteries or energy storage units for later use.

In certain embodiments, the processor may receive a signal from a sensor disposed in the subsea system 10 indicative of a temperature of a production flow received from a well of the subsea system 10. The processor may determine an estimated temperature of the production flow based on the received signal. In response to the estimated temperature of the production flow falling below a threshold temperature, the processor may actuate an actuation assembly to open a bypass valve in a geothermal power system 36 of the subsea system 10 to cause a cessation of flow of the production flow into a geothermal power plant 108 of the geothermal power system 36. It may be appreciated that by the processor causing the production flow to bypass the geothermal power plant 108 in response to the estimated temperature of the production flow falling below the threshold temperature, the formation of hydrates within the geothermal power plant 108 may be mitigated, thereby mitigating the risk of damage sustained by the geothermal power plant 108.

In certain embodiments, the processor may receive a signal from a sensor disposed in the geothermal power plant 108 indicative of an amount of power output by the geothermal power plant 108. The processor may determine an estimated amount of power output by the geothermal power plant 108 based on the signal. In certain embodiments, the processor may control one or more batteries of the subsea system 10 to supply power to the separator in response to the estimated amount of power falling below a threshold amount of power. In certain embodiments, the processor may control the one or more batteries to supply power to one or more additional stations of the subsea system 10 in response to the estimated amount of power falling below the threshold amount of power.

Figure 11:
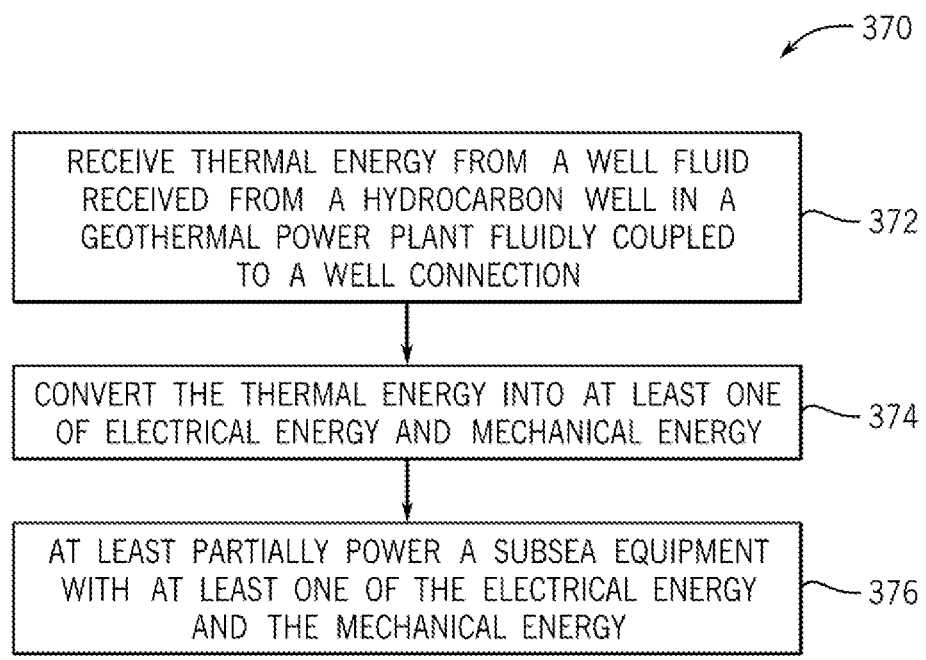
FIG. 11 is a flowchart of an example process for controlling the subsea system of FIG. 1.

FIG. 11 is a flowchart of an example process 370 for controlling the subsea system of FIG. 1. The process 370 may be performed by a processor-based computing device or controller disclosed above with reference to FIG. 2 or any other suitable computing device(s) or controller(s). Furthermore, the blocks of the process 370 may be performed in the order disclosed herein or in any other suitable order. For example, certain blocks of the process 370 may be performed concurrently. In addition, in certain embodiments, at least one of the blocks of the process 370 may be omitted.

In block 372 of the process 370, the subsea system receives thermal energy from a well fluid received from a hydrocarbon well in a geothermal power plant fluidly coupled to a well connection. As discussed herein, a geothermal power system of the subsea system may include one or more well connections configured to couple to one or more geothermal wells.

In block 374 of the process 370, the subsea system converts the thermal energy into at least one of electrical energy and mechanical energy. For example, a geothermal power plant may use the thermal energy to produce steam to turn a turbine. The turbine may produce mechanical energy and/or may be used in conjunction with a generator to produce electrical energy.

In block 376 of the process 370, the subsea system at least partially powers a subsea equipment with at least one of the electrical energy and the mechanical energy produced by the subsea geothermal power system. For example, the subsea system may at least partially power a pump station, a manifold, a separator, a tree, a controller, or a combination thereof using at least one of the electrical energy and the mechanical energy produced by the subsea geothermal power system.

Technical effects of the disclosed embodiments include one or more geothermal power systems 36 that are distributed throughout a subsea system 10 that may be used to produce power that may be utilized by the subsea system and/or a surface platform. In particular, the disclosed embodiments may be used for powering one or more subsea equipment 38, including but not limited to trees coupled to one or more wells throughout the field, one or more field extensions, the controller, the pump station, the manifold, subsea boosting, subsea compression, pipe heating, or a combination thereof. In certain embodiments, power produced by the one or more geothermal power systems 36 may be sent to a surface platform via an electrical cable (e.g., umbilical cable). It may appreciated that a geothermal power system 36 that includes a plurality of geothermal wells may produce sufficient power to eliminate the three phase power cable portion of the electrical cables connecting the surface platform, thereby reducing the manufacturing cost of the electrical cable. A geothermal power system 36 having a plurality of geothermal wells may also eliminate the traditional fuel (e.g., diesel fuel) that may be used for powering pumps and/or separators. Additionally, the one or more geothermal power systems may be able to mitigate the chance of losing power due to a loss of power transmission through the electrical cable. The use of one or more geothermal power systems 36 disposed throughout the subsea system 10 also produces zero carbon emissions, thereby offsetting and potentially reducing the amount of carbon emissions produced for powering various stations of the subsea system 10.

The subject matter described in detail above may be defined by one or more clauses, as set forth below.

A system includes a subsea geothermal power system. The subsea geothermal power system includes a well connection configured to couple to a hydrocarbon well. The subsea geothermal power system also includes a geothermal power plant fluidly coupled to the well connection. The geothermal power plant is configured to receive thermal energy from a well fluid received from the hydrocarbon well and convert the thermal energy into at least one of electrical energy and mechanical energy. The system also includes a subsea equipment at least partially powered by at least one of electrical energy and mechanical energy produced by the subsea geothermal power system.

The system of the preceding clause, wherein the subsea equipment includes a valve, a pump, a compressor, a controller, a sensor, a tree, a manifold, or any combination thereof.

The system of any preceding clause, wherein the geothermal power plant is directly coupled to the subsea equipment.

The system of any preceding clause, further including a retrievable module configured to be retrieved by a remotely operated vehicle (ROV), wherein the retrievable module comprises the geothermal power plant.

The system of any preceding clause, wherein the retrievable module is removably coupled to a portion of a tree.

The system of any preceding clause, wherein the subsea equipment is powered by the mechanical energy produced by the subsea geothermal power system.

The system of any preceding clause, wherein the subsea equipment is powered by the electrical energy produced by the subsea geothermal power system.

The system of any preceding clause, wherein the geothermal power plant includes a fluid circuit having a first heat exchanger configured to transfer the thermal energy from the well fluid to a thermal fluid circulating in the fluid circuit, and a turbine driven by the thermal fluid.

The system of any preceding clause, further including an electrical generator driven by the turbine to generate the electrical energy.

The system of any preceding clause, wherein a plurality of the subsea equipment is electrically powered by the electrical energy produced by the subsea geothermal power system.

The system of any preceding clause, wherein the plurality of subsea equipment includes a plurality of trees associated with a plurality of wells, including the hydrocarbon well.

The system of any preceding clause, wherein the plurality of the subsea equipment includes a tree, a manifold, a pump station, a compressor station, a controller, a field extension, an umbilical cable, or a combination thereof.

The system of any preceding clause, wherein the subsea geothermal power system includes an energy storage system configured to store the electrical energy.

A system includes a subsea retrieval module. The subsea retrievable module includes a fluid connection configured to receive a well fluid. The subsea retrievable module also includes a geothermal power plant fluidly coupled to the fluid connection. The geothermal power plant includes a fluid circuit having a first heat exchanger configured to transfer thermal energy from the well fluid to a thermal fluid circulating in the fluid circuit, and a turbine driven by the thermal fluid. The geothermal power plant is configured to power one or more subsea equipment with at least one of mechanical energy generated by the turbine and electrical energy generated by an electrical generator driven by the turbine.

The system of the preceding clause, wherein the geothermal power plant further includes the electrical generator driven by the turbine to generate the electrical energy.

The system of any preceding clause, wherein the subsea retrievable module is removably coupled to a portion of a tree or a manifold.

The system of any preceding clause, wherein the one or more subsea equipment includes a plurality of trees associated with a plurality of wells, including the hydrocarbon well.

A method of controlling a subsea system includes receiving thermal energy from a well fluid received from a hydrocarbon well in a geothermal power plant fluidly coupled to a well connection. The method also includes converting the thermal energy into at least one of electrical energy and mechanical energy. The method also includes at least partially powering a subsea equipment with at least one of electrical energy and mechanical energy produced by the subsea geothermal power system.

The method of the preceding clause, wherein receiving the thermal energy includes transferring the thermal energy from the well fluid to a thermal fluid circulating in a fluid circuit via a first heat exchanger, and wherein converting the thermal energy includes at least one of driving a turbine with the thermal fluid to generate the mechanical energy and driving an electrical generator with the turbine to generate the electrical energy.

The method of any preceding clause, wherein at least partially powering the subsea equipment includes distributing the electrical energy to a plurality of subsea equipment, including one or more trees, subsea stations, pumps, compressors, valves, manifolds, controllers, field extensions, or umbilical cables.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system comprising:
    a subsea geothermal power system comprising:
        a well connection configured to couple to a hydrocarbon well; and
        a geothermal power plant fluidly coupled to the well connection, wherein the geothermal power plant is configured to receive thermal energy from a well fluid received from the hydrocarbon well and convert the thermal energy into at least one of electrical energy or mechanical energy; and
    a subsea equipment at least partially powered by at least one of the electrical energy or the mechanical energy produced by the subsea geothermal power system, wherein the subsea equipment is configured to internally re-route the well fluid to:
        flow into the subsea geothermal power system via a first valve; and
        flow out of the subsea geothermal power system via a second valve;
    wherein the geothermal power plant is directly coupled to the subsea equipment; and
    wherein the geothermal power plant comprises:
        one or more releasable connections configured to directly couple the geothermal power plant to the subsea equipment; and
        one or more remotely operated vehicle (ROV) connectors configured to couple the geothermal power plant to an ROV.

2. The system of claim 1, wherein the subsea equipment further comprises another valve, a pump, a compressor, a controller, a sensor, a tree, a manifold, or any combination thereof.

3. The system of claim 1, further comprising a retrievable module configured to be retrieved by the ROV, wherein the retrievable module comprises the geothermal power plant.

4. The system of claim 3, wherein the retrievable module is removably coupled to a portion of a tree.

5. The system of claim 1, wherein the subsea equipment is powered by the mechanical energy produced by the subsea geothermal power system.

6. The system of claim 1, wherein the subsea equipment is powered by the electrical energy produced by the subsea geothermal power system.

7. The system of claim 1, wherein the geothermal power plant comprises a fluid circuit having a first heat exchanger configured to transfer the thermal energy from the well fluid to a thermal fluid circulating in the fluid circuit, and a turbine driven by the thermal fluid.

8. The system of claim 7, further comprising an electrical generator driven by the turbine to generate the electrical energy.

9. The system of claim 1, wherein a plurality of the subsea equipment is electrically powered by the electrical energy produced by the subsea geothermal power system.

10. The system of claim 9, wherein the plurality of the subsea equipment comprises a plurality of trees associated with a plurality of wells, including the hydrocarbon well.

11. The system of claim 9, wherein the plurality of the subsea equipment comprises a tree, a manifold, a pump station, a compressor station, a controller, a field extension, an umbilical cable, or a combination thereof.

12. The system of claim 1, wherein the subsea geothermal power system comprises an energy storage configured to store the electrical energy.

13. A system comprising:
    a subsea equipment; and
    a subsea retrievable module configured to directly couple to the subsea equipment, the subsea retrievable module comprising:
        a fluid connection configured to receive a well fluid;
        one or more releasable connections configured to directly couple the subsea retrievable module to the subsea equipment;
        one or more remotely operated vehicle (ROV) connectors configured to couple the subsea retrievable module to an ROV; and
        a geothermal power plant fluidly coupled to the fluid connection, wherein the geothermal power plant comprises a fluid circuit having a first heat exchanger configured to transfer thermal energy from the well fluid to a thermal fluid circulating in the fluid circuit, and a turbine driven by the thermal fluid;
    wherein the subsea equipment is configured to internally re-route the well fluid to:
        flow into the subsea retrievable module via a first valve; and
        flow out of the subsea retrievable module via a second valve;
    wherein the geothermal power plant is configured to power the subsea equipment with at least one of mechanical energy generated by the turbine or electrical energy generated by an electrical generator driven by the turbine.

14. The system of claim 13, wherein the geothermal power plant further comprises the electrical generator driven by the turbine to generate the electrical energy.

15. The system of claim 13, wherein the subsea retrievable module is removably coupled to a portion of a tree or a manifold.

16. The system of claim 13, wherein the subsea equipment comprises a plurality of trees associated with a plurality of wells.

17. A method of controlling a subsea system, comprising:
    directly coupling a subsea retrievable module to a subsea equipment associated with a hydrocarbon well via one or more releasable connectors, wherein the subsea retrievable module comprises:

a geothermal power plant;
the one or more releasable connectors; and
one or more remotely operated vehicle (ROV) connectors;
adjusting a first valve to cause a well fluid extracted from the hydrocarbon well to flow from the subsea equipment into the subsea retrievable module;
adjusting a second valve to cause the well fluid to flow out of the subsea retrievable module;
receiving thermal energy from the well fluid received from the hydrocarbon well in the geothermal power plant fluidly coupled to a well connection;
converting the thermal energy into at least one of electrical energy or mechanical energy; and
at least partially powering the subsea equipment with at least one of the electrical energy or the mechanical energy.

18. The method of claim 17, wherein receiving the thermal energy comprises transferring the thermal energy from the well fluid to a thermal fluid circulating in a fluid circuit via a first heat exchanger, and wherein converting the thermal energy comprises at least one of driving a turbine with the thermal fluid to generate the mechanical energy or driving an electrical generator with the turbine to generate the electrical energy.

19. The method of claim 17, wherein at least partially powering the subsea equipment comprises distributing the electrical energy to a plurality of subsea equipment, including one or more trees, subsea stations, pumps, compressors, valves, manifolds, controllers, field extensions, or umbilical cables.

20. The method of claim 17, comprising adjusting the second valve to cause the well fluid to flow out of the subsea retrievable module and into the subsea equipment.

* * * * *